US005786004A

United States Patent [19]

Yamauchi

[11] Patent Number: 5,786,004

[45] Date of Patent: Jul. 28, 1998

[54] APPARATUS FOR PRODUCING ICE VESSEL

[76] Inventor: Keijiro Yamauchi, at Kabushiki Kaisha Yamanouchi Seisakusho of 1-8-18, Katakura, Kanagawa-ku, Yokohama-shi, Kanagawa ken, Japan

[21] Appl. No.: 851,227

[22] Filed: May 5, 1997

Related U.S. Application Data

[63] Continuation-in-part of Ser. No. 515,474, Aug. 15, 1995, Pat. No. 5,634,344.

[30] Foreign Application Priority Data

| | | | |
|---|---|---|---|
| Sep. 30, 1994 | [JP] | Japan | 6-237792 |
| Jun. 27, 1995 | [JP] | Japan | 7-161044 |

[51] Int. Cl.[6] .......... B29C 43/02; B29C 43/34; F25C 5/14

[52] U.S. Cl. .......... 425/408; 62/71; 62/340; 62/353; 425/412; 425/423

[58] Field of Search .......... 425/408, 412, 425/422, 423, 444; 62/341, 340, 344, 353, 75, 498

[56] References Cited

U.S. PATENT DOCUMENTS

| | | | |
|---|---|---|---|
| 530,526 | 12/1894 | Holden . | |
| 3,008,301 | 11/1961 | Baillif et al | 62/353 |
| 3,031,863 | 1/1962 | Corn | 62/353 |
| 3,283,526 | 11/1966 | Le Boeuf | 62/353 |
| 3,287,927 | 11/1966 | Jacobus | 62/353 |
| 3,367,127 | 2/1968 | Walker | 62/353 |
| 4,535,605 | 8/1985 | Gram | 62/345 |
| 4,571,320 | 2/1986 | Walker . | |
| 4,686,076 | 8/1987 | Dromingny et al. . | |
| 4,755,128 | 7/1988 | Alexander et al. . | |
| 4,780,119 | 10/1988 | Brooke . | |
| 4,920,762 | 5/1990 | Beckstead et al. . | |
| 4,965,027 | 10/1990 | Takahashi . | |
| 5,069,044 | 12/1991 | Holum et al. . | |
| 5,372,492 | 12/1994 | Yamauchi | 425/408 |
| 5,419,138 | 5/1995 | Anderson et al. . | |

FOREIGN PATENT DOCUMENTS

| | | |
|---|---|---|
| 6-194018 | 7/1994 | Japan . |

*Primary Examiner*—Khanh P. Nguyen
*Attorney, Agent, or Firm*—Quarles & Brady

[57] ABSTRACT

An apparatus for automatically producing ice vessels. A male die 21 is provided opposite to a female die 11. A bottom surface of the female die 11 is formed with a through-hole 15, in which is provided a reciprocating body 17. The body 17 is capable of being raised or lowered by cylinder 18. Above one side of the female die 11 is provided a chute box 31 having an outlet port 31A facing the female die 11. Adjacent the female die 11 is provided carrier arms 41 movable toward or away from each other. An ice pieces equalizer 28 is provided above the female die 11. Ice pieces I are accomodated into the female die 11 with the body 17 protruding from the bottom surface thereof. A surplus amount of the accomodated ice pieces I are removed by the approach and return trip of the equalizer 28. Then, the body 17 is lowered to form a sinking. After that, an ice vessel is molded by depressing the male die 21. Owing to the equalizer 28, surplus amount of ice pieces in the female die 11 are removed to ensure the molding of an ice vessel A having a uniform thickness.

2 Claims, 11 Drawing Sheets

APPARATUS FOR PRODUCING ICE VESSEL

CROSS REFERENCE TO RELATED APPLICATIONS

This application is a continuation-in-part application of U.S. Ser. No. 08/515,474 filed on Aug. 15, 1995, now U.S. Pat. No. 5,634,344.

BACKGROUND OF THE INVENTION (a) Field of the Invention

The present invention relates to an apparatus for forming ice pieces into ice vessels for dishing up or covering food such as vegetable salad, sashimi or the like.

(b) Description of Prior Art

In the past, an apparatus for producing ice vessel for vegetable salad or the like has been proposed in Japanese Patent Application Un-Examined Publication No.6-194018, of which the columns 1 and 2 disclose an apparatus for producing ice vessels comprising a female die, a male die opposite to said female die for cooperating with said female die to define a mold cavity for forming said ice vessels, a through-hole formed at the bottom of said female die, a pushing-out pin which is raised and lowered in said through-hole by an elevator device, a chute box for feeding ice pieces from suitable ice crusher into said female die, said chute box having an outlet located above said female die and an inlet located below said ice crusher for receiving ice pieces therefrom, a carrier-arm device provided above said female die. The prior apparatus for producing ice vessels is operated in such a manner that relatively large masses of ice pieces fed from an ice making machine are crushed by the ice crusher and then supplied to the female die through the chute box, which are molded by the male die cooperating with the female die, so that molded ice vessels are taken out by the pushing-out pin raised by the elevator device, which are subsequently transported by the carrier arm device.

Such molded ice vessels are generally served for guests of a hotel or an inn, either with vegetable salad or sashimi accomodated therein to keep them cool or with such food dished up in a vessel in advance covered therewith.

According to the prior art, however, when ice pieces are fed from the chute into the female die, ice pieces have accumulated more thickly or heaped up in the center thereof than in the edge side thereof, which has sometimes caused molded ice vessel to be easily broken off at its edge side. Further, according to the prior art, ice masses are ceaselessly supplied from the ice making machine to the ice crusher, which are subsequently crushed thereby to be yet ceaselessly fed into the female die. However, such production process of ice pieces cannot meet needs for constant ice volume required for producing one ice vessel, so that it has been difficult to supply ice pieces in proper quantities.

SUMMARY OF THE INVENTION

Accordingly, it is a main object of the present invention to provide an apparatus for producing ice vessels which can mold an ice vessel having a uniform thickness.

It is another object of the present invention to provide an apparatus for producing ice vessels which can meet needs for mass production of ice vessels.

In accordance with a major feature of the present invention, there is provided an apparatus for producing ice vessels comprising a female die; a male die opposite to said female die; a through-hole formed at a bottom of said female die; a reciprocating body which is raised or lowered in said through-hole by an elevator device; a chute box for feeding ice pieces, having an oulet port facing the female die from above; an ice pieces equalizer which is slidable over an upper surface of the female die.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 5 generally illustrates an ice pieces equalizer of the embodiment of the invention, of which FIG. 5(A) is a perspective view thereof, while

FIG. 6 generally illustrates the first and second working processes in the embodiment of the invention, of which

FIG. 7 generally illustrates the third and fourth working processes in the embodiment of the invention, of which

FIG. 8 generally illustrates the fifth and sixth working processes in the embodiment of the invention, of which

DESCRIPTION OF PREFERRED EMBODIMENT

Figure 1:
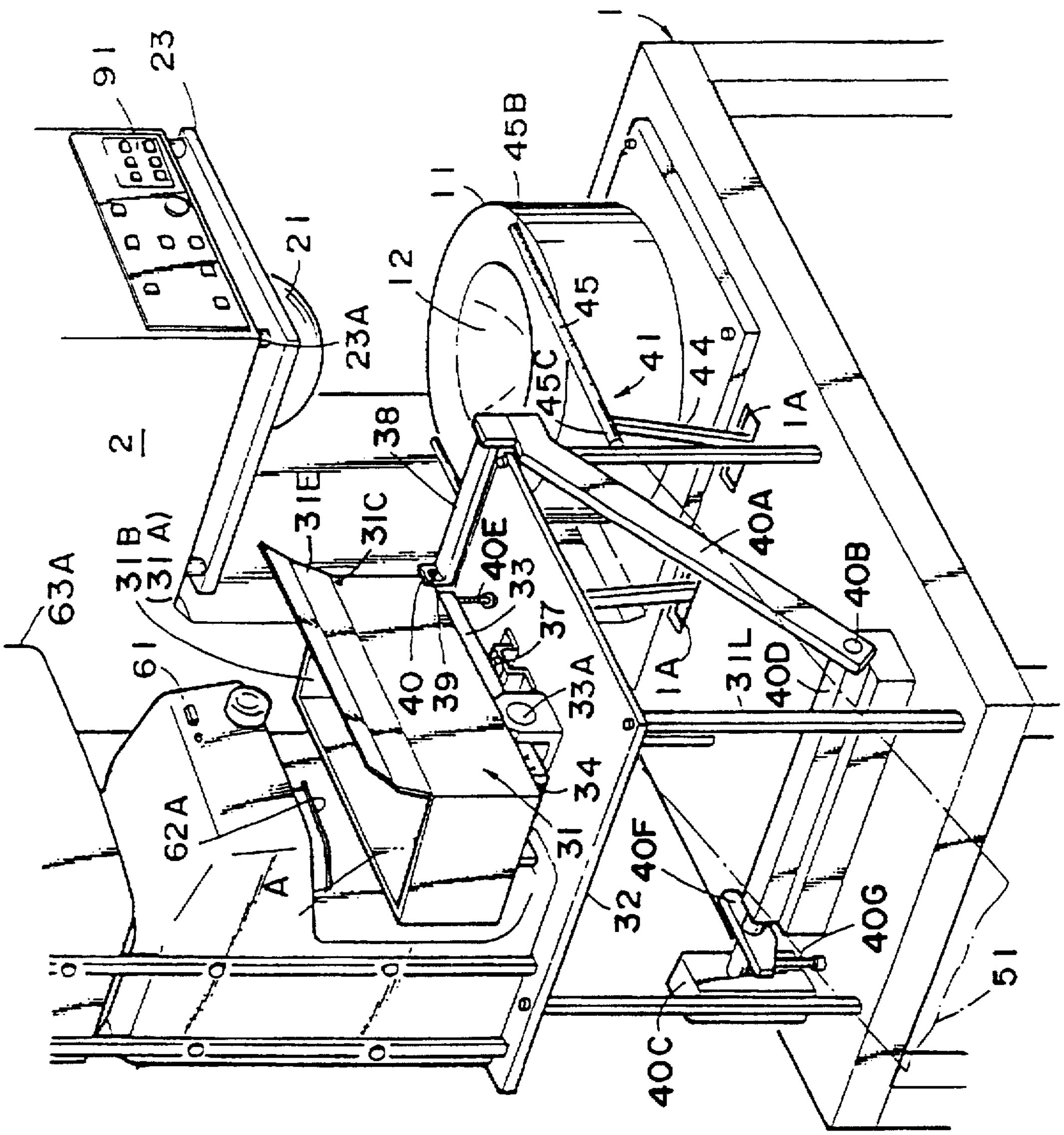
FIG. 1 is a perspective view showing an embodiment of the invention, wherein a chute box is in a horizontal stand-by position.
Figure 2:
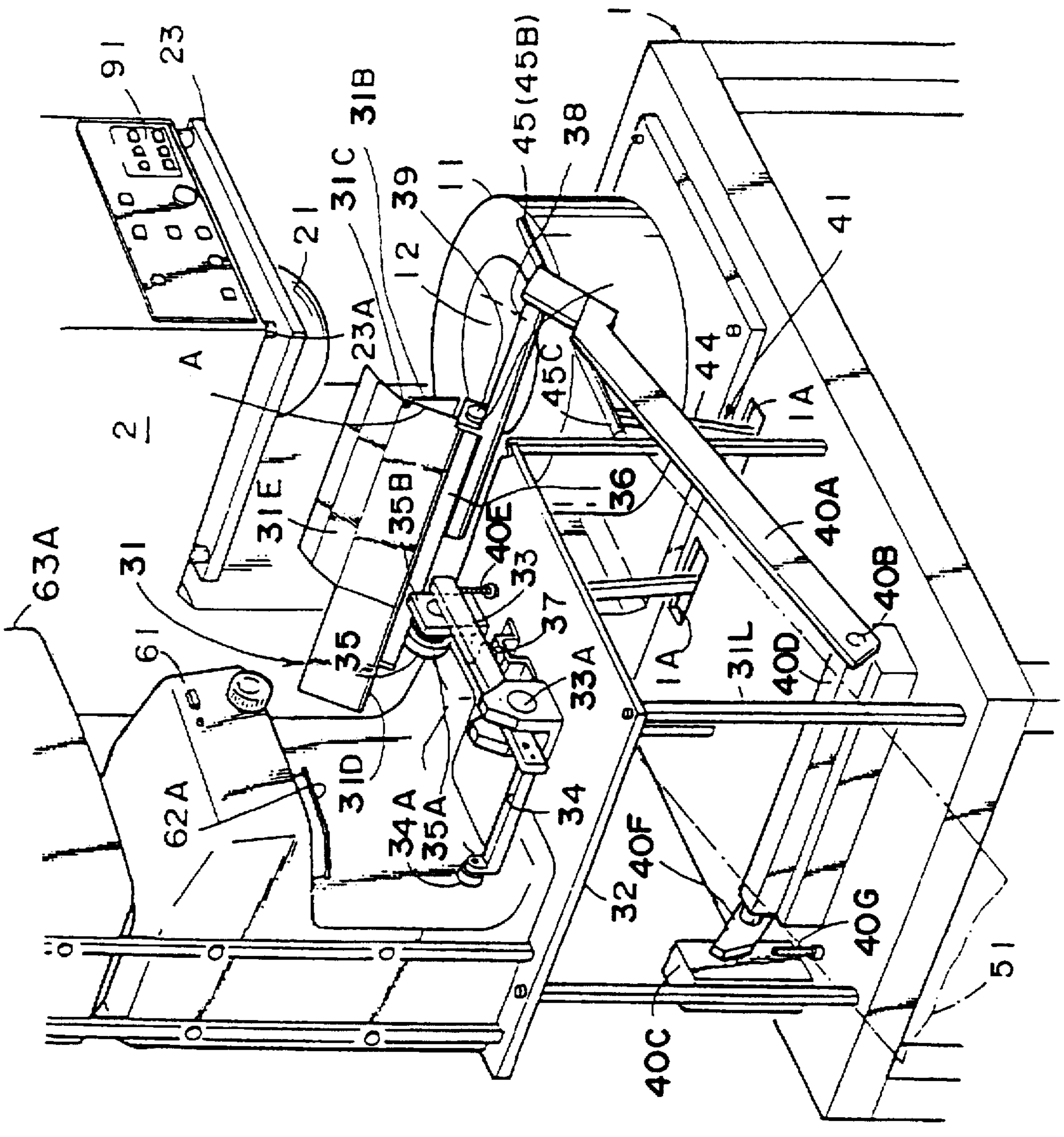
FIG. 2 is a perspective view showing the embodiment of the invention, wherein a chute box is in an inclined position.
Figure 3:
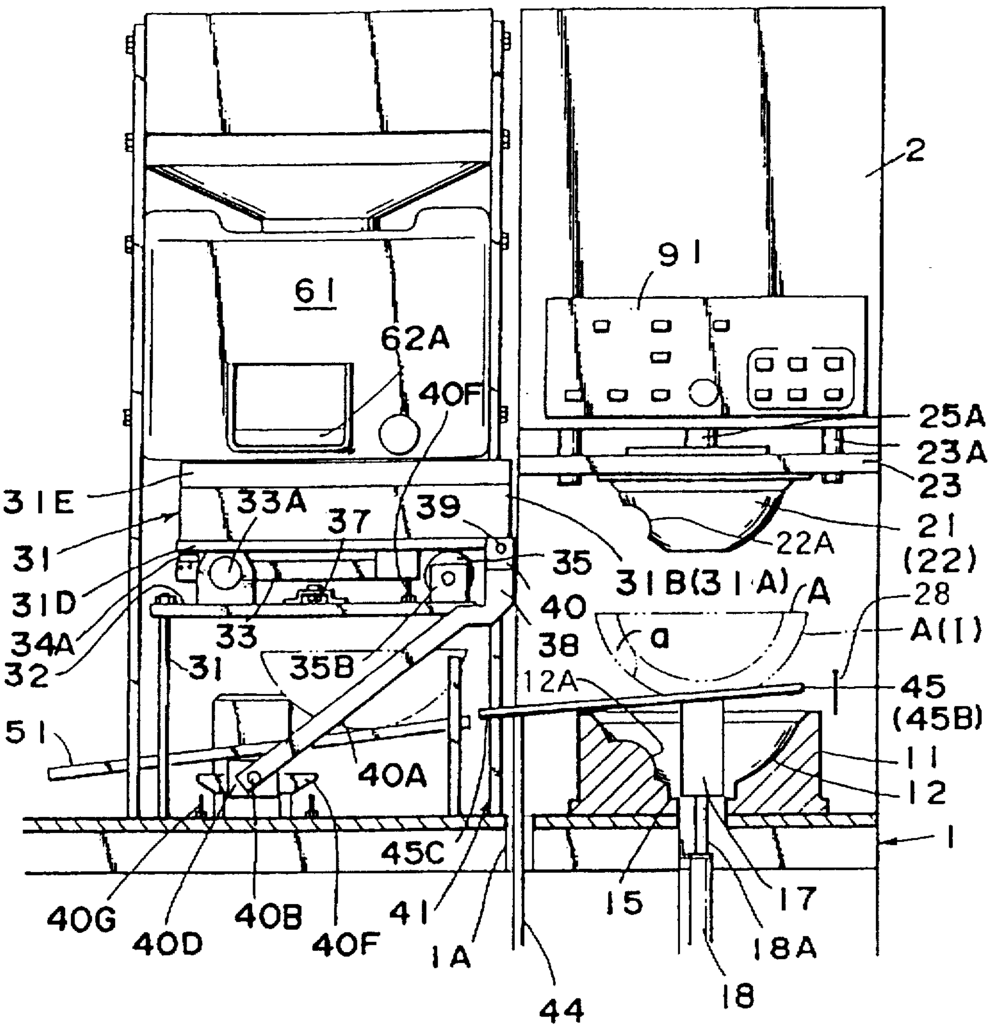
FIG. 3 is a section showing the embodiment of the invention.
Figure 4:
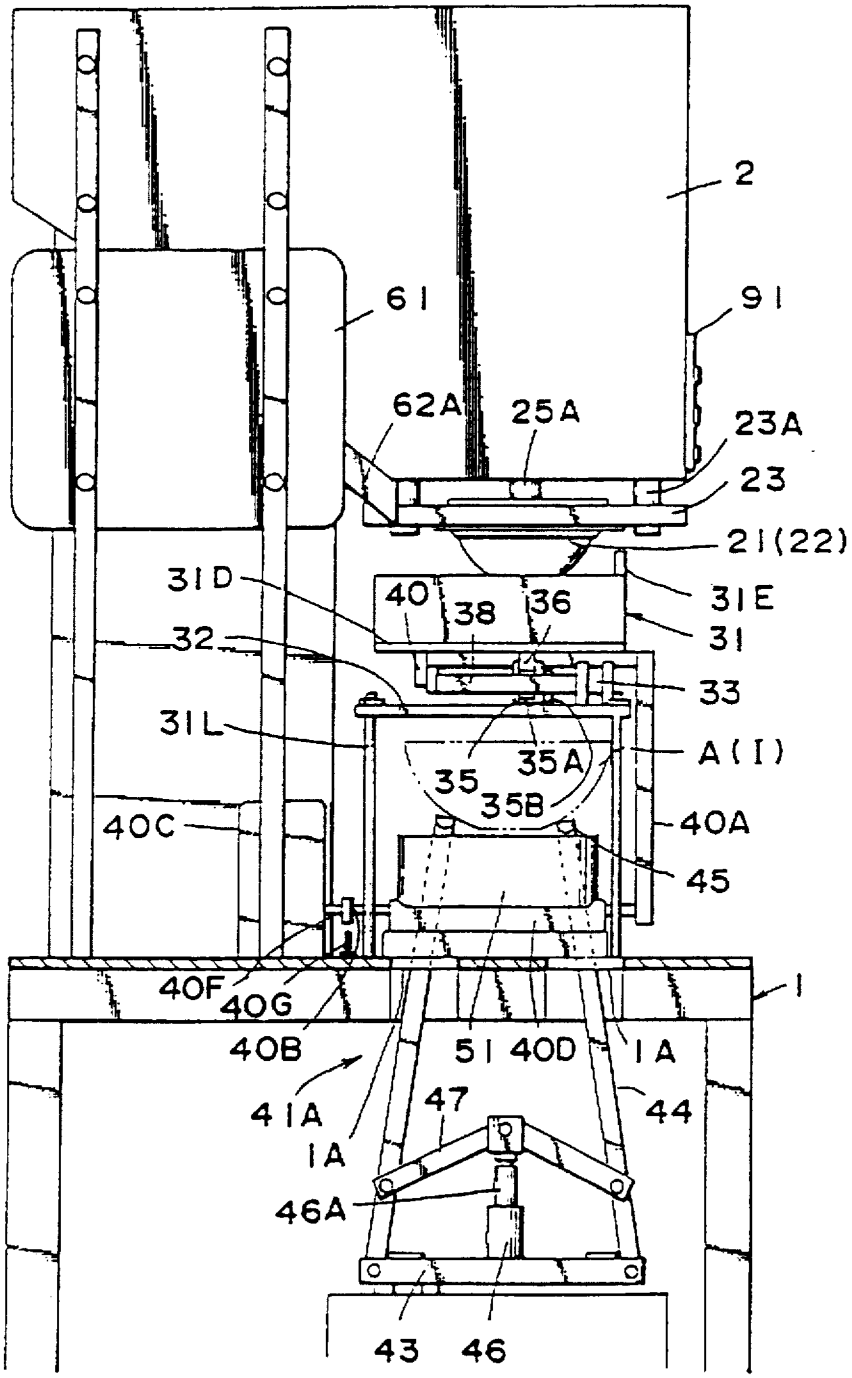
FIG. 4 is a side view showing the embodiment of the invention.

Hereinafter is described an embodiment of the present invention with reference to the attached drawings.

To base frame 1 is fixed female die 11, opposite to which is provided male die 21, which is vertically movable. At one side between elevated male die 21 and female die 11 is provided chute box 31 for feeding ice pieces I into the female die 11, while at its other side is provided carrier arm device 41 for transporting molded ice vessels. Adjacent the carrier arm device 41 is provided transporting chute 51.

An upper surface of the female die 11 is formed with semispherical concave portion 12 which is, for example, surface-treated with fluorine. The concave portion 12 is formed at one side with expansion 12A in order that window aperture "a" may be formed in an ice vessel A hereinbelow described. At the lowest part of the concave portion 12 is vertically provided through-hole 15, in which is provided cylindrical reciprocating body 17, having pneumatic cylinder device 18 therebelow as an elevator device with a distal end of rod 18A of the cylinder device 18 being connected to the body 17.

An lower surface of the male die 21 is formed with semispherical convex portion 22 which is, for example, surface-treated with fluorine as well. The convex portion 22 is formed at one side with recess 22A to be fitted into the expansion 12A. To an upper surface of the male die 21 is fixed mounting plate 23. Onto upper frame 2 provided above base 1 is secured pneumatic cylinder device (not shown) directed vertically downward, having rod 25A whose distal end is connected to said mounting plate 23. Thus, the actuation of the cylinder device can allow the male die 21 to press toward the female die 11. The reference numeral 23A designates guiding rod for elevating motion. Although not shown, there are provided upper and lower limit detection switches for male die 21.

Figure 5B:
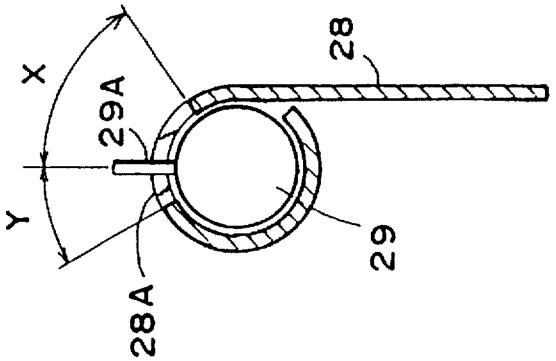
FIG. 5(B) is a section thereof.
Figure 5A:
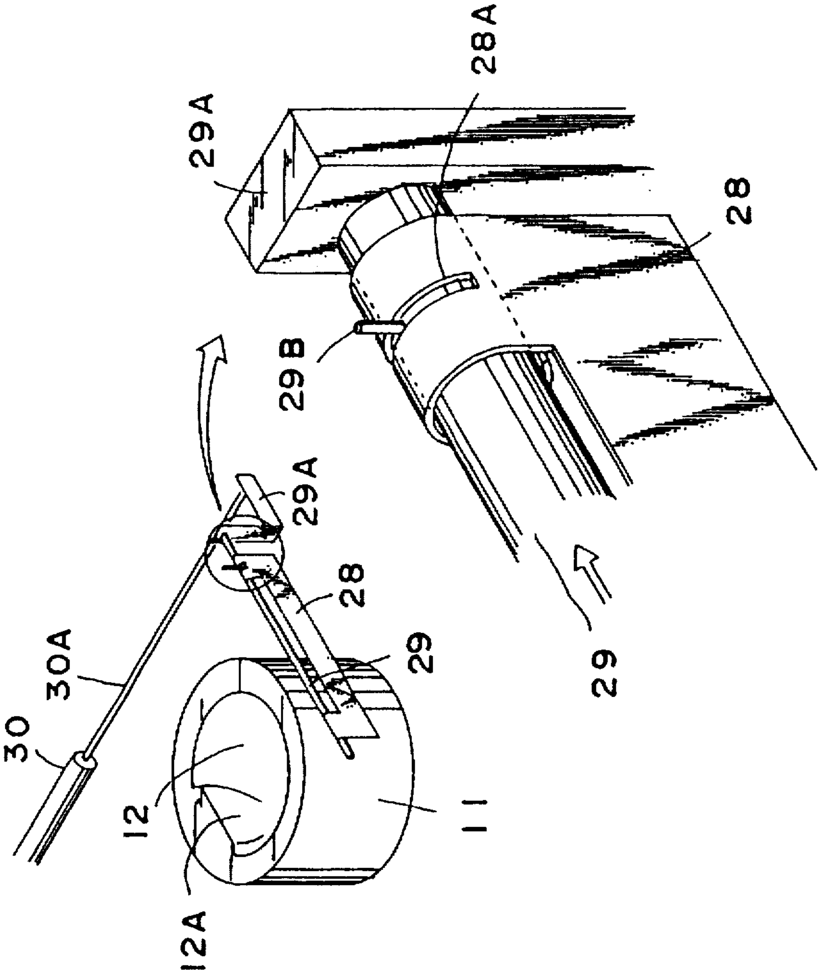

Referring to FIG. 5, ice pieces equalizer 28 sliding above the female die 11 is formed of stainless steel plate or the like which can slide across an entire surface of the semispherical concave portion 12, having its both upper ends connected to shaft 29, which is connected to rod 30A of pneumatic cylinder device 30 through connector 29A. The pneumatic cylinder 30 is provided at one side of the female die 11, while the ice pieces equalizer 28 is normally located at the other side thereof with the rod 30A being extended.

In the case of connecting the equalizer 28 with the shaft 29, there is provided a pin or stopper 29B extending from the shaft 29, while the equalizer 28 is formed with elongated hole 28A, thus rotatably anchoring the pin 29B by fitting the same into the hole 28A, whereby an lower end of the equalizer 28 can be rotated. In other words, in an approaching route where rod 30A is shrinked to move the equalizer 28 toward the above-mentioned one side, the lower end of the equalizer 28 can be inclined at an angle Y toward the above-mentioned one side, while in a return route where rod 30A is extended to move the equalizer 28 toward the other side, the lower end can be inclined at an angle X toward the other side (in the present case, X>Y)

The chute box 31 is a rectangular box, having an upper aperture as an inlet port and side-door 31B as an outlet port 31A. The side-door 31B has pivot 31C in the upper portion. At the front part of the chute box 31 is erected block wall 31E such that the block wall 31E is positioned opposite to supply port 62A of automatic ice crusher 61 hereinafter described. The chute box 31 is mounted on horizontal plate 32 which is fixed and supported by legs 31L above the base frame 1. Approximately in the middle of the front part of the horizontal plate 32 is mounted lever 33, which is reciprocatively moved up and down with respect to fulcrum shaft 33A. Half crossed rod 34 is connected to the end of the lever 33 such that they are orthogonal to each other. To the end of the half crossed rod 34 is mounted roller 34A so that bottom plate 31D of said chute box 31 may slide thereon. In the middle of said horizontal plate 32 is axially horizontally provided roller 35 having groove 35A around the periphery thereof. The roller 35 is rotatably mounted to mounting seat 35B, so that bar 36 secured in the center of bottom plate 31D of the chute box 31 is capable of sliding on the groove 35A.

On the horizontal plate 32 is mounted proximity detector 37 facing the middle position between fulcrum shaft 33A and roller 35 to detect the position of the chute box 31. The switch of said proximity detector 37 is not depressed by lever 33 while chute box 31 is kept horizontal without predetermined amount of ice pieces I in said chute box 31. On the other hand, the switch thereof is depressed by lever 33 either when chute box 31 is filled with a predetermined amount of ice pieces I, or after it is filled with a predetermined amount thereof at the side near to female die 11.

Along the lower edge of outlet port 31A of the chute box 31 is provided rod 38 to drive the chute box 31 back and forth, and projecting piece 40 of the rod 38 is rotatably connected to shaft 39 on both sides of outlet port 31A of said chute box 31. To the end of rod 38 is connected the upper end of rocking arm 40A provided obliquely above the front part of the base frame 1. With the lower end of said rocking arm 40A is linked one end of rotation shaft 40B in a right-angled manner. With the other end of the rotation shaft 40B is connected pneumatic cylinder device 40C provided for rotation drive. To support the rotation shaft 40B is provided supporting member 40D, which is rotatably penetrated by the rotation shaft 40B. Additionally, stop 40E for height control is screwed into the end of the lever 33, and a pair of opposite stops 40G, also for height control, are screwed from both sides of projecting piece 40F, which is fixed to one of the ends of the rotation shaft 40B nearer to the cylinder device 40C, into the base frame 1.

The actuation of said pneumatic cylinder device 40C allows the angle of elevation of the rocking arm 40A to change from nearly 35 degrees to nearly 10 degrees. The arm 40A is to be returned to the initial position and the process is to be repeated by controlling the pneumatic cylinder device 40C. Where necessary, to the lever 33 may be mounted a balance weight (not shown).

The carrier arm 41 comprises pendulous arms 44 spacedly disposed, said pendulous arms 44 having the lower ends thereof penetrate through holes 1A formed in the base frame 1. To the upper ends of the pendulous arms 44 are connected holding arms 45 extending toward the female die 11 respectively. The holding arms 45 are obliquely provided so that one end 45B of each holding arm 45 is kept higher than the other end 45C which leads to the transporting outlet chute 51. In order to move the pendulous arms 44 toward and away from each other, pneumatic cylinder device 46 is perpendicularly mounted on the frame 43 with its rod 46A rotatably connected to one end of each of the interlocking arms 47, and the other ends thereof rotatably connected to the pendulous arms 44, respectively.

Automatic ice crusher 61 is placed in the back part of said horizontal plate 32 so as to supply said chute box 31 with ice pieces I. The ice supply port 62A of the automatic ice crusher 61 is provided above the left part of the aperture of chute box 31.

Figure 10:
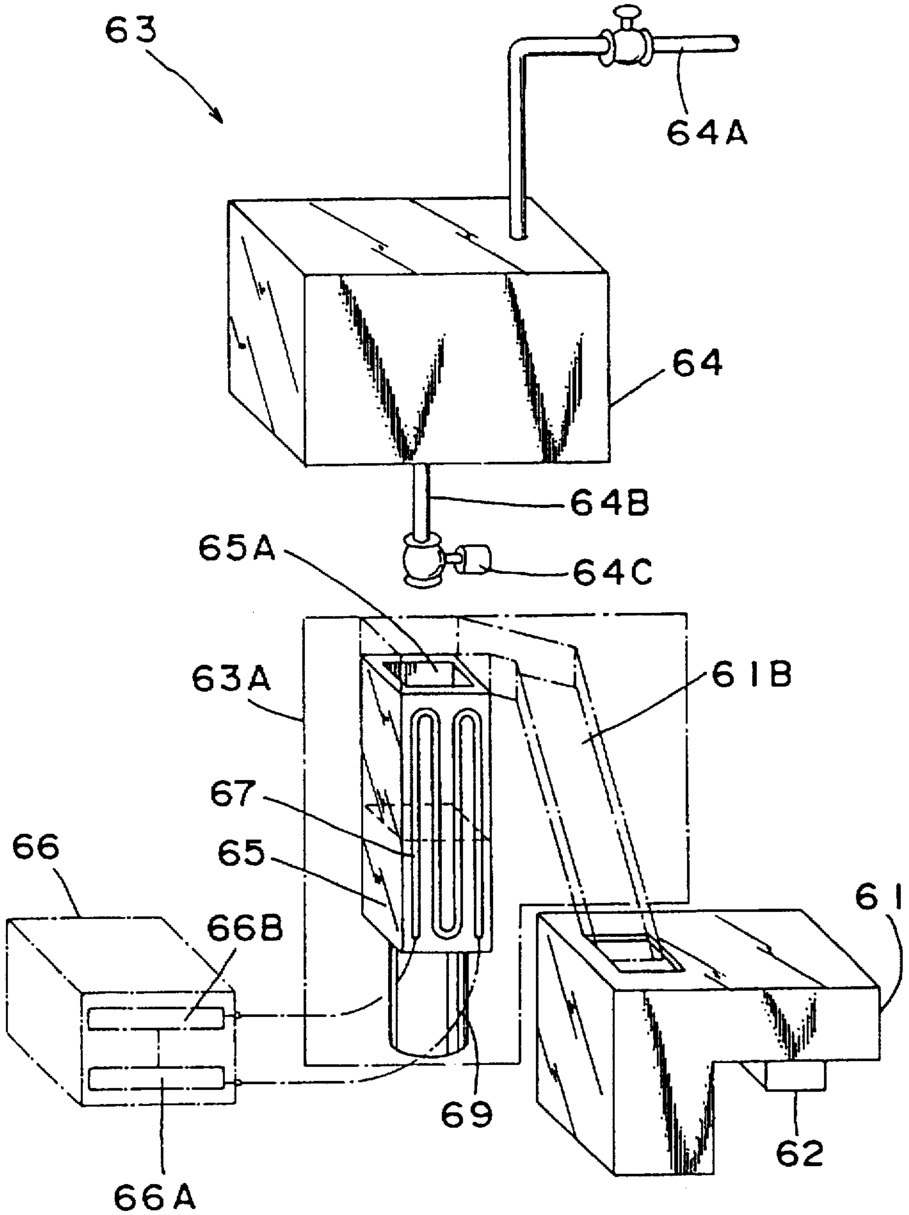
FIG. 10 is a perspective view showing an ice making machinery of the embodiment of the invention.
Figure 11:
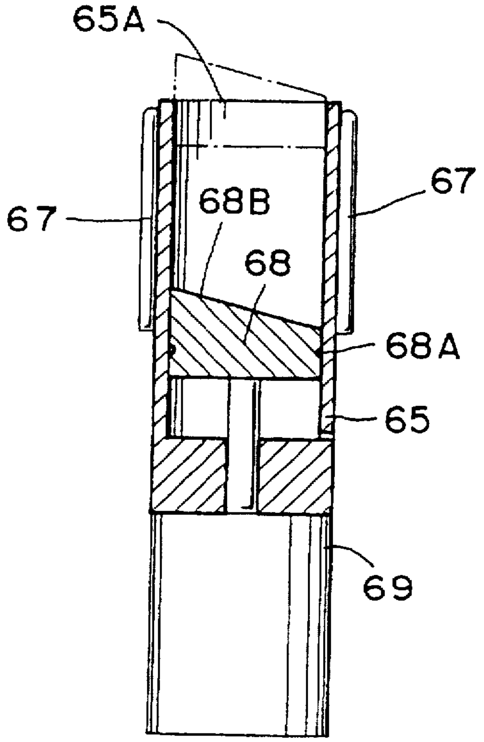
FIG. 11 is a section showing an ice making box of an embodiment of the invention.

In FIGS. 10 and 11 illustrating ice making machinery 63 for supplying the automatic ice crusher 61 with ice masses, the machinery 63 comprises water cooler 64, ice making box 65 and refrigeration unit 66. The cooler 64 disposed above has a refrigerating machine (not shown) and holds constant a water level of water supplied from water pipe 64A and keep the same cold, preferably within a range from 0 to 4 degs centigrade, having supply port 64B having automatic closing valve 64C, thus providing feed-water line for the ice making box 65, which has an upper aperture 65A opposite to the supply port 64B to receive the cold water. To a periphery of the ice making box 65 is secured evaporator 67 formed from a meandering pipe, which is connected to the refrigeration unit 66 across a flexible pipe. The refrigeration unit 66 has built-in motor-driven compressor 66A and condensor 66B. At a bottom of the ice making box 65 is slidably provided pushing-out pin 68, which is provided with pneumatic or hydraulic cylinder 69 mounted on a lower surface of the bottom, having rod 69A which penetrates through the bottom of the ice making box 65 to connect to the pushing-out pin 68. An inner surface of the ice making box 65 and a surface of the pushing-out pin 68 are each coated with fluororesin layer (not shown), while around a peripheral surface of the pin 68 is provided O-ring 68A for watertight purpose, said pin 68 having its upper surface 68B inclined.

In addition, there is provided guide plate 61B for guiding ice masses from the upper aperture 65A to inlet 61A of the automatic ice crusher 61. Reference numeral 63A designates heat insulating chamber.

Figure 6A:
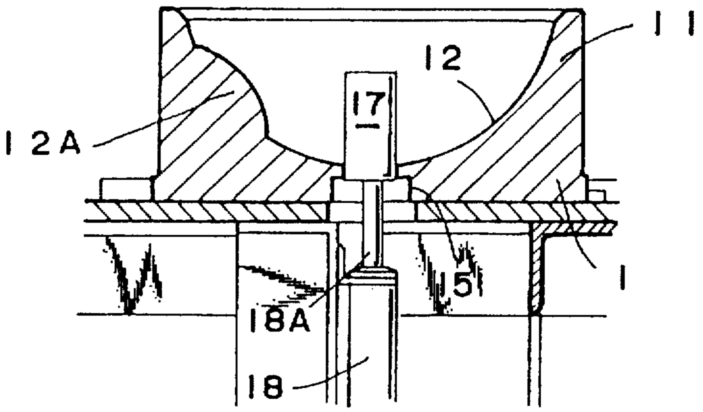
FIG. 6(A) illustrates the first process, while FIG. 6(B) the second process.
Figure 6B:
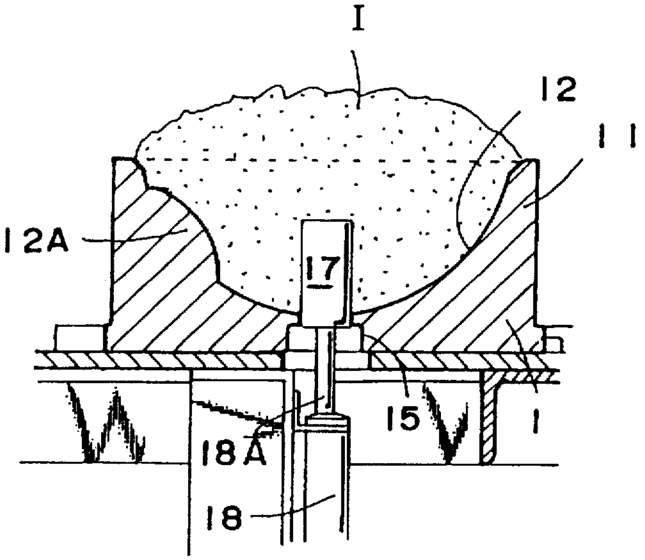

Hereinafter is described an action of the above-described structure. When a starting switch (not shown) of operation panel 91 is actuated, the reciprocating body 17 vertically rises within the concave portion 12 of the female die 11, as shown in FIG. 6(A). The height of the body 17 is predetermined so as to be half as long as the depth of the concave portion, but not to exceed the upper edge of the female die 11.

Whilst, the ice making machinery 63 is actuated in advance for storage of cold water in the water cooler 64. The actuation of the starting switch allows the automatic closing valve 64C to open, thus feeding the cold water into the ice making box 65. At that time, the pin 68 is lowered, while the volume of the fed cold water corresponds to that required to produce a single ice vessel A hereinbelow described. The automatic closing valve 64 is opened during a certain time preset by a timer (not shown) built in the operation panel 91.

Then, the cold water accomodated into the ice making box 65 is further cooled by the evaporator 67. In other words, refrigerant such as freon or freon substitute is evaporated within the evaporator 67 to deprive the ice making box 65 of heat, thereby transforming the cold water into block-shaped ices. The refrigerant of the evaporator 67 is compressed by the compressor 66A, and then, liquidized due to outgoing radiation in the condenser 66B. The liquidized refrigerant is then delivered to the evaporator 67 again, then circulates in the same manner.

After ice masses are produced in the above described manner, the cylinder 69 is actuated to raise the pushing-out pin 68 until its inclined upper surface 68B slightly protrudes from the upper aperture 65A, whereby the ice masses are pushed out still upward relative to the upper aperture 65A so that they intermittently fall into the inlet 61A, sliding on the guide plate 61B.

The production of the ice masses and the intermittent supply of ice pieces by the automatic ice crusher 61 are each synchronized to a production cycle of an ice vessel A, by control of the automatic closing valve 64C and the cylinder 69. For example, a position detector switch (not shown) is provided so as to be turned on in response to the movement of the carrier arm device 41, thereby detecting the conveyance of molded ice vessel to link each operation of automatic closing valve 64C, cylinder 69 and automatic ice crusher 61 through sequence circuit (not shown) of operation panel 91.

In the above-described manner, ice masses fed into automatic ice crusher 61 are crushed to about 2 or 5 mm-sized ice pieces, and then, from the outlet chute 62 are fed ice pieces I into the chute box 31.

Sequential filling of ice pieces I into the chute box 31 causes the weight in chute box 31 to generally increase. This causes chute box 31 to rotate clockwise around shaft 33B together with lever 33. Then, proximity detector 37 is actuated to detect the presence of sufficient ice pieces charged in chute box 31, so that the automatic ice crusher 61 stops supplying ice pieces I.

The actuation of the proximity detector 37 allows pneumatic cylinder 40C to work, which causes rotation shaft 40B to rotate together with rocking arm 40A, so that chute box 31 is pulled out and inclined toward female die 11 with bar 36 sliding on roller 35. Consequently, door 31B is opened to feed ice pieces I from outlet port 31A into the hemispherical concave portion 12 of female die 11, thus accomodating ice pieces I in concave portion 12 with the same heaped up therein.

Thereafter, reverse actuation of said pneumatic cylinder device 40C allows the chute box 31 to return to the initial position. The proximity detector 37 detects the chute box 31 being empty so as to be fed with ice pieces I from ice supply port 62A in preparation for the next production run.

Figure 7A:
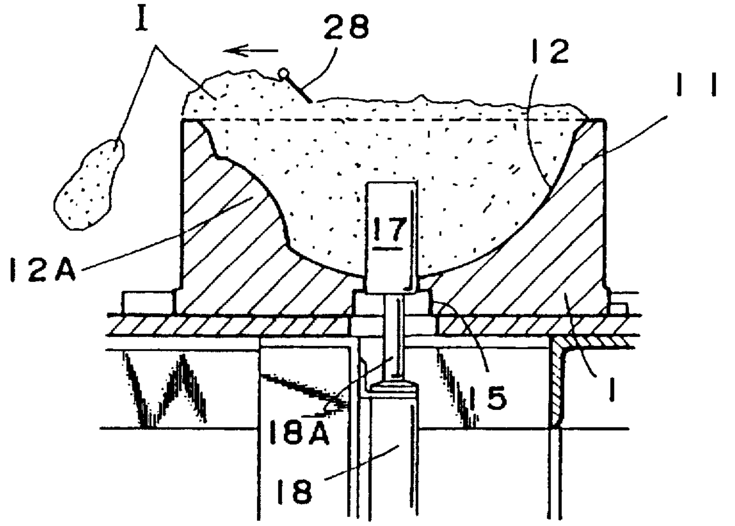
FIG. 7(A) illustrates the third process, while FIG. 7(B) the fourth process.
Figure 7B:
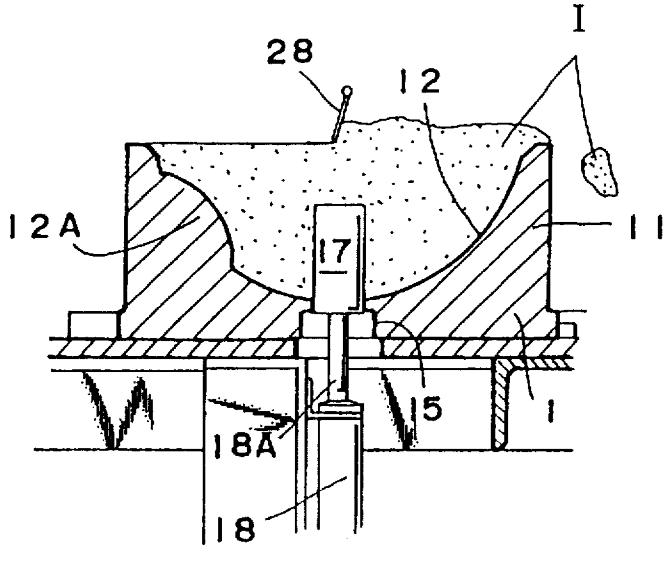

Subsequently, pneumatic cylinder device 30 is actuated to shrink rod 30A so as to allow the ice pieces equalizer 28 to slide above ice pieces I heaped up in the concave portion 12 (see FIGS. 7(A) and 7(B)). Thus, the ice pieces equalizer 28 is allowed to move toward the above-mentioned one side (i.e., approach route) with the same inclined at an angle Y to remove surplus amount of ice pieces I heaped up in concave portion 12, and then rod 30A is extended to move the equalizer 28 toward the other side (i.e., return route) with the same inclined at an angle X to further remove the remaining surplus amount of ice pieces I, whereby the ice pieces I can be accomodated into the concave portion 12 up to the volume of the concave portion 12 at maximum.

Figure 8A:
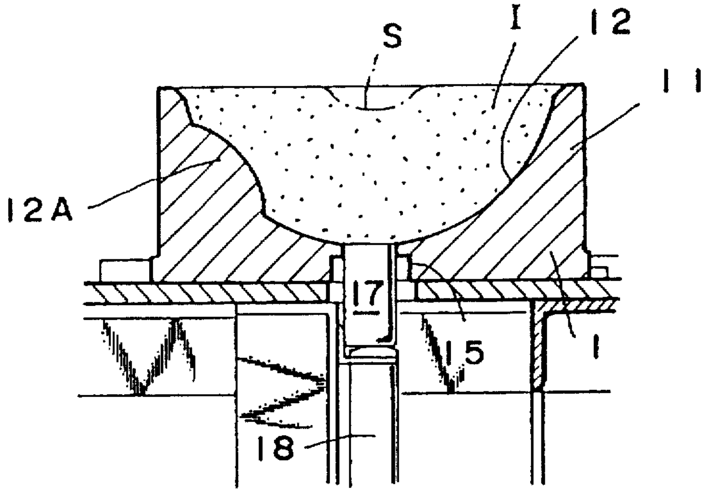
FIG. 8(A) illustrates the fifth process, while FIG. 8(B) the sixth process.
Figure 8B:
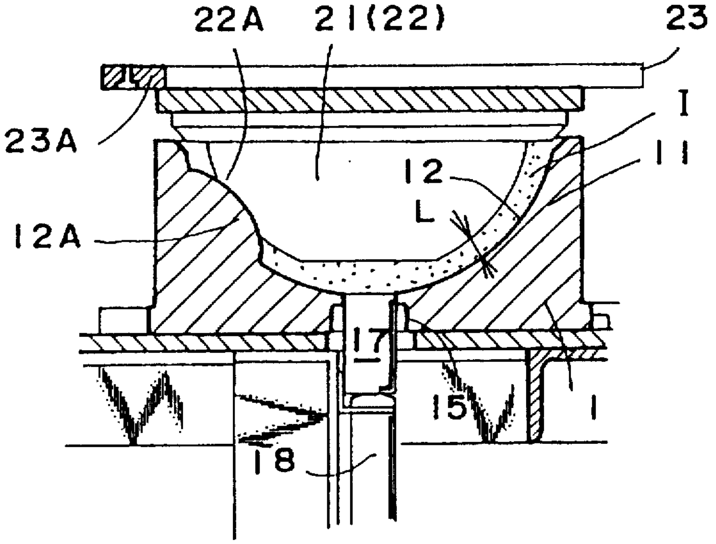

Thereafter, pneumatic cylinder device 18 contracts its rod 18A so that reciprocating body 17 is withdrawn toward the bottom of hemispherical concave portion 12 (see FIG. 8A), whereby the center portion of the ice pieces I accomodated in the concave portion 12 can be formed with sinking S. Consequently, the section of the ice pieces I in the concave portion 12 will be approximately U-shaped, thereby ensuring nearly equal thickness of ice pieces layer. It is noted that the volume of the sinking S is approximately equal to that of the reciprocating body 17.

Then, the male die 21 is lowered by extending rod 25A of the cylinder device to the aforesaid lower limit detection switch, thereby depressing the convex portion 22 into the concave portion 12 to form the ice pieces I accomodated in concave portion 12 into a hemispherical ice vessel A.

Figure 9:
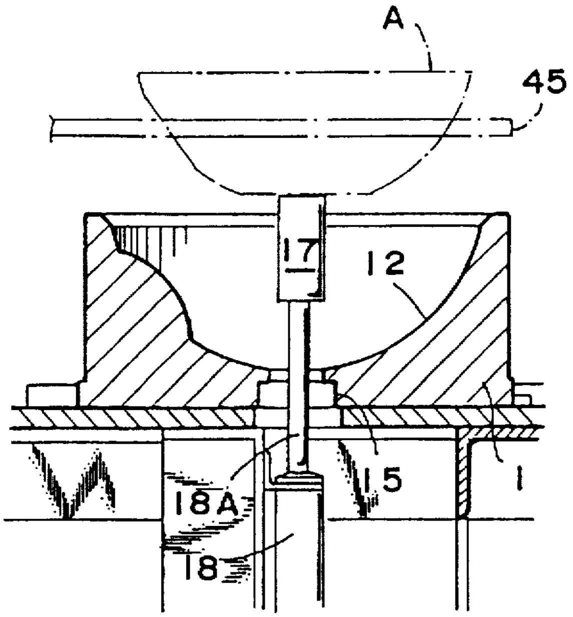
FIG. 9 is a section illustrating the seventh working process of the embodiment of the invention.

After producing ice vessel A in the above-described manner, rod 25A is contracted to raise male die 21 up to the position of the said upper limit switch for detecting the upper elevating limit of male die 21. Thereafter, rod 18A is extended by cylinder device 18 in order to raise reciprocating body 17 up to the upper edge surface of female die 11, thereby allowing a molded ice vessel A to be lifted up, with the same carried on the body 17, as shown in FIG. 9. Then, rod 46A is extended by cylinder device 46, so that the distance between the two pendulous arms 44 linked by interlocking arm 47 is generally decreased. Consequently, the distance between the two lower ends of the laterally paired holding arms 45 becomes narrower than the length corresponding to the diameter of said ice vessel A. Then rod 18A is lowered by cylinder device 18 together with said ice vessel A, which is to be positioned onto said paired holding arms 45, sliding on the slope defined by the holding arms 45, so that ice vessel A falls down for a short distance to be placed on the outlet chute 51. Thereafter, the ice vessel A is transported, sliding along the slope of the outlet chute 51, to be presented as a dish for vegetable salad or raw food such as "SASHIMI".

According to an embodiment of the invention, there is provided an apparatus for producing ice vessel, which comprises: a female die 11, a male die 21 opposite to said female die; a through-hole 15 formed at the bottom of said female die 11; a reciprocating body 17 which is raised or lowered in said through-hole 15 by a pneumatic cylinder device 18; a chute box 31 for feeding ice pieces I, having an outlet port 32 facing the female die 11 from above; and an ice pieces equalizer 28 which is slidable over an upper surface of the female die 11, whereby a proper quantity of ice pieces I can be formed into an ice vessel A by depressing the male die 21 to the female die 11 after removal of the surplus amount of the ice pieces I heaped up in the female die 11, so that each of the molded ice vessels A can have a uniform thickness L.

Further, as the aforesaid ice pieces equalizer 28 is a tabular member connected to the pneumatic cylinder device 30, its actuation and levelling action is ensured, which is particularly true because such pneumatic cylinder device is used as a sliding-motion driving means.

Specifically, the ice pieces equalizer 28 removes a part of the accumulated ice pieces I with the same inclined at angle Y during its approach trip, while it removes the remaining surplus ice pieces I with the same inclined at angle X during its return trip, thus ensuring the removing of the surplus amount of ice pieces I through multiple removing processes.

Seen from another aspect of an embodiment of the invention, there is provided an apparatus for producing ice vessel which comprises: an ice making machine 63 which comprises an ice making box 65 having a cold water supply port 64B, an evaporator 67 provided in the ice making box 65, a refrigerant compressor 66A and condensor 66B connected to the evaporator 67, an ice pieces pushing-out pin 68, an automatic ice crusher 61, a female die 11 for accomodating the crushed ice pieces and an elevatable male die 21 opposite to the female die 11, whereby the ice making box 65 having cold Water accomodated therein can be directly cooled to intermittently produce ice masses, so that the production of ice vessels A can be quickly started.

Specifically, as the volume of the ice making box 65 corresponds to that for required when producing one ice vessel A, the ice-making, crushing, molding and transporting can be carried out in sequence per a unit quantity for making ice, thereby efficiently making ice. Further, as the pushing-out pin 68 has the inclined upper surface 68B, most of ice masses protruding from the upper aperture 65A can be successfully fed into inlet 61A of automatic ice crusher 61 through guide plate 61B.

Incidentally, it should be noted that the present invention should not be limited to the foregoing embodiment but may be modified within a technical scope of the invention.

What is claimed:

1. An apparatus for producing ice vessels comprising:

an ice making machine having an ice making box, an evaporator provided in the ice making box, a refrigerant compressor and condensor connected to the evaporator and a ice pieces pushing-out pin elevatable within the ice making box, an ice crusher for crushing ice masses supplied from said ice making machine;

a female die for accomodating crushed ice thereinto;

a male die opposite to said female die, which is capable of being raised or lowered.

2. An apparatus for producing ice vessels according to claim 1, wherein a volume of said ice making box is approximately equal to that of said female die.

* * * * *